United States Patent
Ganard et al.

[11] Patent Number: 6,095,132
[45] Date of Patent: Aug. 1, 2000

[54] GAS BURNER FOR SMOKER GRILL

[75] Inventors: John Ganard, New Braunfels, Tex.; James P. Jollay, Columbus, Ga.

[73] Assignee: W. C. Bradley Company, Columbus, Ga.

[21] Appl. No.: 09/134,184

[22] Filed: Aug. 14, 1998

[51] Int. Cl.[7] .................................................. A23B 4/044
[52] U.S. Cl. ........................................ 126/41 R; 126/242
[58] Field of Search ............................... 126/41 R, 242, 126/25 R, 39 R, 92 AC, 92 B, 92 C; 99/482; 431/343, 354, 355, 329

[56] References Cited

U.S. PATENT DOCUMENTS

| | | | |
|---|---|---|---|
| 658,890 | 10/1900 | Brooks | 431/355 |
| 2,336,816 | 12/1943 | Thompson | 126/92 B |
| 3,202,205 | 8/1965 | Webster | 126/92 B |
| 3,688,758 | 9/1972 | Stephen, Jr. | 126/41 R |
| 4,076,008 | 2/1978 | Deaton | 126/25 R |
| 4,521,180 | 6/1985 | Walter et al. | 431/25 |
| 4,561,419 | 12/1985 | Koziol | 126/41 R |
| 4,747,391 | 5/1988 | Hanagan et al. | 126/41 R |
| 4,788,962 | 12/1988 | Mashburn et al. | 126/41 R |
| 4,829,978 | 5/1989 | Schlosser | 126/41 R |
| 5,673,613 | 10/1997 | Price | 99/482 |

*Primary Examiner*—Ira S. Lazarus
*Assistant Examiner*—Sara Clarke
*Attorney, Agent, or Firm*—James W. Kayden; Thomas, Kayden, Horstemeyer & Risley

[57] ABSTRACT

A gas burner for a smoker grill includes a venturi tube having an inlet adapted and arranged for receiving a flow of gas from a gas supply, a burner end adapted and arranged for placement within the interior of a grill casing, a burner end having a burner outlet, at least one air inlet arranged through said venturi tube and located adjacent said inlet, and an ash guard at least partially encasing the burner end. The ash guard incorporates metal screen disposed across the burner outlet and a metal housing at least partially surrounding the burner outlet to prevent ashes formed in the smoker from extinguishing the burner flame. Spider guards formed of metal screen material are also provided at the air inlet.

18 Claims, 3 Drawing Sheets

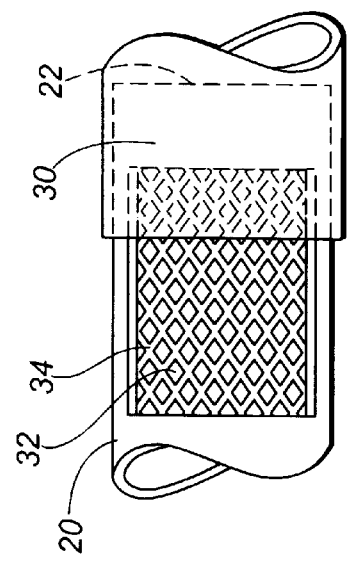
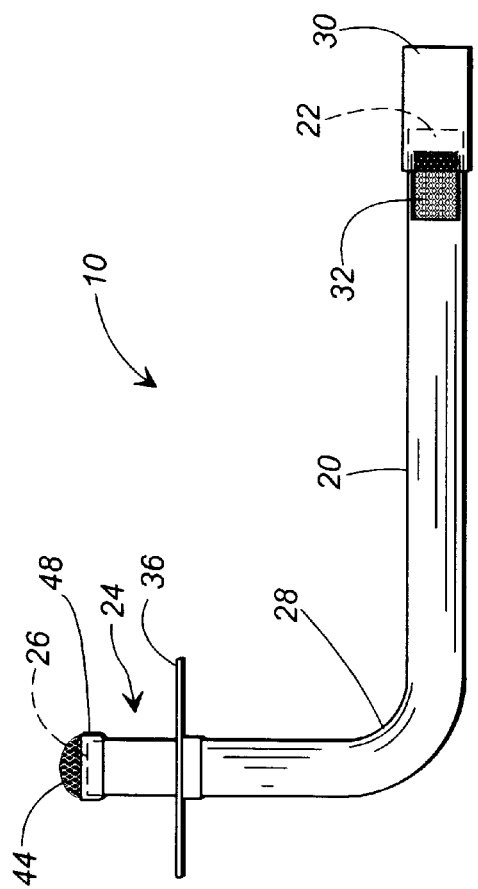
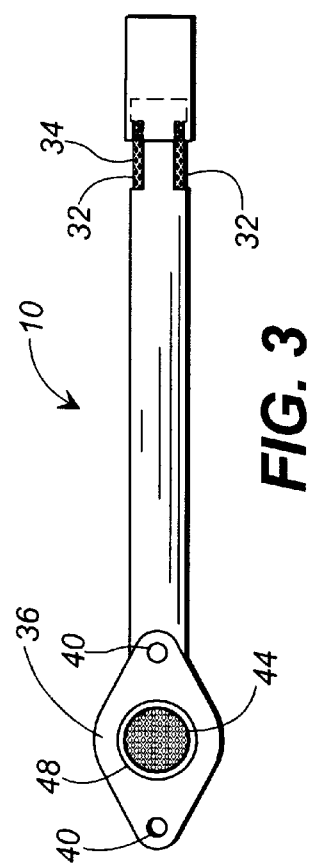

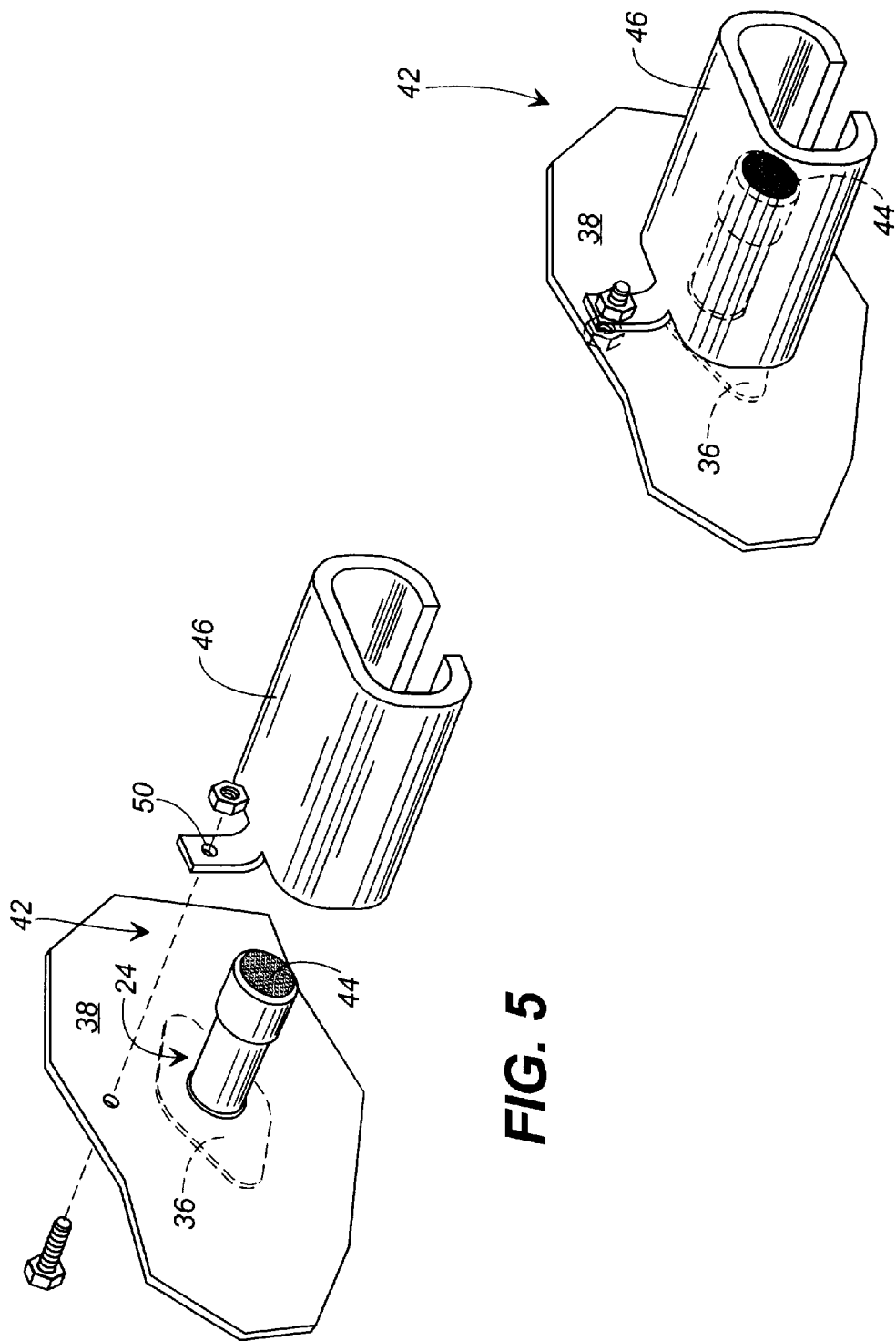

GAS BURNER FOR SMOKER GRILL

FIELD OF THE INVENTION

The present invention relates generally to gas barbecue grills. More particularly, the present invention relates to a gas burner for a gas-fired smoker grill.

BACKGROUND OF THE INVENTION

Food items, such as meat, fish, etc., are commonly smoked by placing the items in a container or smoke box wherein wood, such as hickory, mesquite, etc., is smoldered. The smoldering wood emits an aromatic smoke which fills the smoke box and which imparts a distinctive smoked flavor to the food items. In order for the smoked flavor to deeply penetrate the food items and develop to a desirable flavor intensity, the wood within the smoke box is allowed to smolder for prolonged periods of time, i.e. several hours, so that the food items are continuously surrounded by the smoke created by the wood.

Many prior art devices for smoking food items, known as smokers, exist which typically require a user to manually create a fire within the smoker and then manually maintain the smoldering of the wood while the items are being smoked. Since this process can last several hours, as described above a user can spend an inordinate amount of time preparing the smoker and tending to the smoker in order to produce a quality smoked food item. A difficulty often arises while tending to a smoker, and in particular, while tending to gas-fired smokers, because ashes formed in the fire box from the smoldering wood tends to fall to the bottom of the fire box where the ashes can extinguish the flame.

Therefore, a need exists in the art for an improved smoker which allows for convenient creation of a fire within the smoker and which provides a convenient manner for maintaining the flame within the fire box so that quality smoked food items can be produced.

SUMMARY OF THE INVENTION

Briefly described, the present invention comprises an improved gas burner for a smoker grill which provides a convenient manner for maintaining a flame within the fire box of a smoker grill so that smoked food items can be conveniently produced. This is accomplished by providing the gas burner with a venturi tube and an associated ash guard which reduces the tendency of ashes to collect at the burner outlet of the venturi tube, thereby reducing the tendency for ashes to extinguish the burner's flame. The gas burner can be used to ignite additional fuels, such as wood, charcoal, etc., which are placed within the fire box of the smoker grill, or can be used without additional fuels to maintain an ideal smoking temperature within the smoker. Additionally, the fact that propane produces water vapor as a by-product when burned also helps to maintain moisture content in the food being smoked.

A preferred embodiment of the gas burner incorporates a support bracket attached to the venturi tube for securely mounting the gas burner to the body or casting of the smoker, thereby allowing the gas burner and its venturi tube to serve as a support structure for a gas supply tank and regulator. The venturi tube is formed of metal tubing with a length and interior diameter of suitable dimensions for delivering a mixture of gas, provided from a supply tank or gas supply line, and air to a smoker. The venturi can be arranged in various shapes, such as by incorporating one or more bends of various angles, so that attachment of an inlet end of the venturi to a regulator valve and/or gas supply line can be conveniently accommodated. In a preferred embodiment, the venturi incorporates a single bend of approximately 90° in order to accommodate placement of a gas supply tank in close proximity to the smoker while maintaining the tank at a suitable distance from the burner end of the venturi.

In a preferred embodiment, the venturi also incorporates a support bracket, which can take the form of a flange, plate, or other fastenable structure, which protrudes from the exterior of the venturi to provide a rigid surface for securing the venturi to the exterior of a smoker casing. The support bracket can be fastened to the exterior of the casing by bolts, screws, welds or other suitable methods so that the burner end of the venturi extends into the interior of the smoker casing. Thus configured, the support bracket provides rigid attachment of the venturi to a smoker casing, thereby allowing the venturi to provide support and stability to a gas supply tank when so incorporated.

The burner end of the venturi extends into the interior of the smoker casing and incorporates an ash guard for limiting the ability of ashes, which collect at the bottom of the fire box during use, from extinguishing the burner's flame. In a preferred embodiment, the ash guard includes both an ash screen for covering the burner outlet and an ash retainer which partially encases the burner end. The ash retainer forms an additional physical barrier between the burner outlet and ashes deposited in the vicinity of the burner end, thereby creating an air gap which allows for continued burner flame propagation.

Other objects, features, and advantages of the present invention will become apparent to one with skill in the art upon examination of the following drawings and detailed description. It is intended that all such objects, features, and advantages be included herein within the scope of the present invention, as defined in the appended claims.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

FIG. 2 is a top view of the embodiment shown in FIG. 1;

FIG. 3 is a side view of the embodiment shown in FIGS. 1 and 2;

FIG. 4 is a partially cut-away view of the embodiment of FIGS. 1, 2 and 3 showing detail of the air inlet and spider guard; and FIG. 5 is a partially cut-away, partially exploded perspective view of the burner end of a preferred embodiment showing detail of the ash screen and ash retainer.

FIG. 6 is a partially cut-away perspective view of the burner end of a preferred embodiment showing detail of the ash screen and ash retainer.

DETAILED DESCRIPTION OF THE PREFERRED EMBODIMENT

Figure 1:
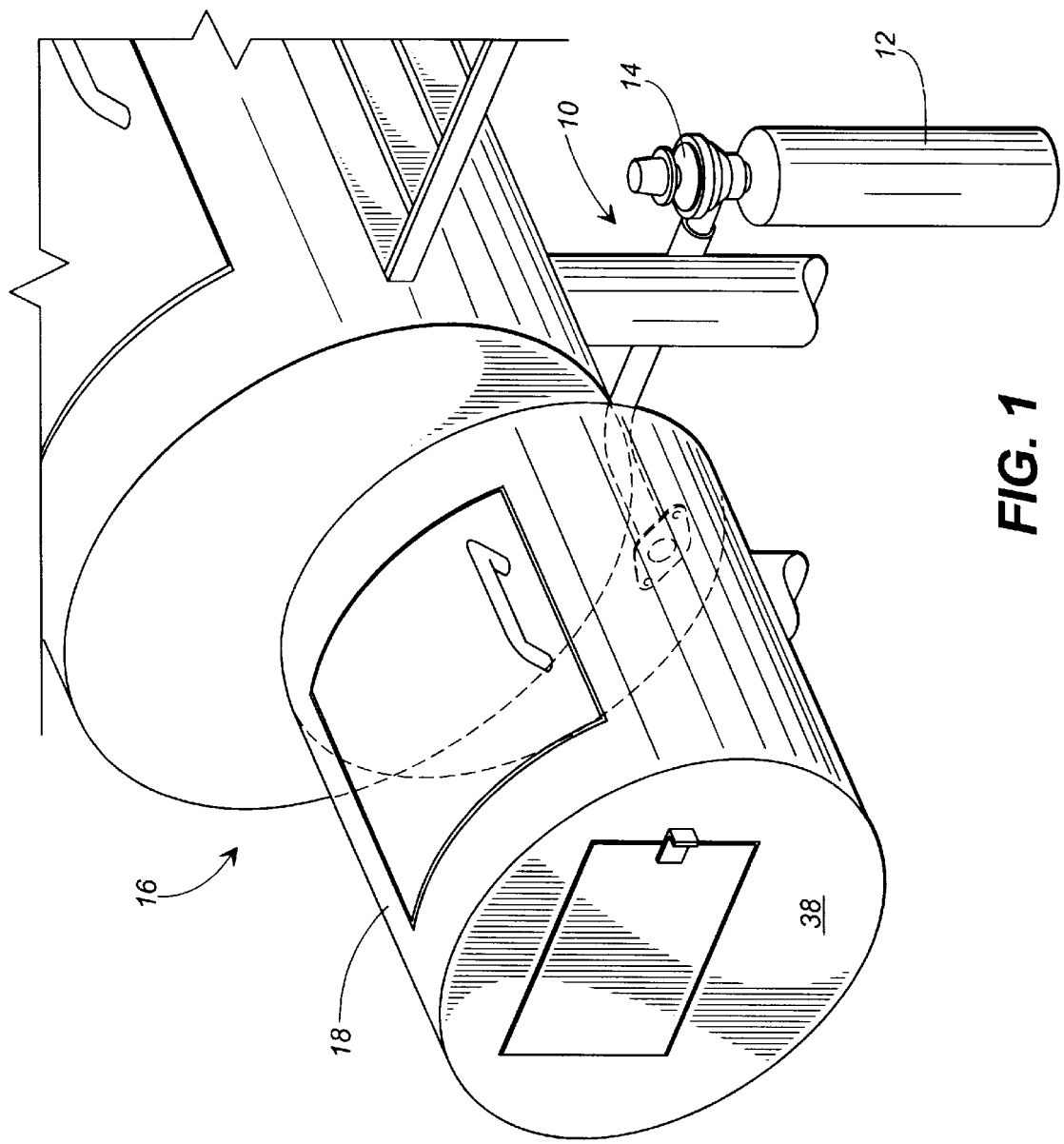
FIG. 1 is a partially cut-away, perspective view of a preferred embodiment of the present invention mounted to a smoker.

Reference will now be made in detail to the description of the invention as illustrated in the drawings with like numerals indicating like parts throughout the several views. It should be noted that hereinafter, reference will be made to practicing the teachings of the present invention with smoker grills incorporating gas supply tanks; however, it should be understood that the present invention is not limited to use only with smokers incorporating gas supply tanks. By means of example, the present invention may be used equally as well with gas smokers which are adapted for connection to gas supply lines, such as residential supply lines.

As shown in FIG. 1, the gas burner 10 of the present invention is adapted for delivering a mixture of gas, supplied by a tank 12 through a regulator 14, and air to the interior of a smoker grill 16 so that a flame can be provided within the fire box 18 of the smoker 16. The gas burner 10 (FIG. 2) incorporates a venturi tube 20 with an inlet 22 and a burner end 24 which has a burner outlet 26. The venturi tube 20 is formed of metal tubing, such as tube steel, stainless steel, aluminum, etc., with a length and interior diameter of suitable dimensions for delivering the mixture of gas and air.

The venturi 20 also can be arranged in various shapes, such as by incorporating one or more bends 28 of various angles, so that attachment of the inlet 22 of the venturi to a regulator 14 can be conveniently accommodated. In a preferred embodiment (FIGS. 2 and 3), the venturi incorporates a single bend of approximately 90° in order to accommodate placement of the tank 12 in close proximity to the smoker 16 while maintaining the tank at suitable distance from the burner end 24 of the venturi (FIG. 1). A sleeve 30 also can be incorporated at the inlet 22 to facilitate attachment of the venturi to the regulator.

As shown in FIG. 4, at least one air inlet 32 is formed in the venturi adjacent the inlet 22. In a preferred embodiment (FIG. 3), air inlet 32 is configured as a pair of opposing rectangular inlets each of which partially underlies the sleeve 30 and each of which cooperates with spider guard 34. Spider guard 34 is formed of a metal screen, such as stainless steel mesh, etc., and is attached to the interior of the venturi, such as by welding, crimping, etc., so that the guard is securely retained in position at the air inlet. So configured, the spider guard allows air to pass through the inlet and into the venturi for mixing with any gas delivered from the tank 12 while preventing foreign objects, such as leaves, insects, etc., from entering the venturi and restricting the flow of gas and air.

In a preferred embodiment (FIGS. 1, 2 and 3), the venturi also incorporates a support bracket 36, which can take the form of a flange, plate, etc., which is attached to the venturi by crimping, welding, etc., and which protrudes from the exterior of the venturi to provide a rigid surface for securing the venturi to the exterior of the casing 38 of a smoker 16. The support bracket 36 also can incorporate mounting orifices 40 and can be fastened to the exterior of the grill casing 38 by bolts, screws, welds or other suitable methods so that the burner end 24 of the venturi extends into the interior of the smoker when so fastened. Thus configured, the support bracket provides rigid attachment of the venturi to the casing while allowing the venturi to provide support and stability to a tank 12 when so incorporated.

As shown in FIG. 5, the burner end 24 of the venturi extends into the interior of the smoker casing and incorporates an ash guard 42 for limiting the ability of ashes, which collect at the bottom of the grill during use, from extinguishing the burner's flame. In a preferred embodiment, the ash guard includes both an ash screen 44 for covering the burner outlet 22 and an ash retainer 46 which partially encases the burner end 24, thereby forming a physical barrier between the burner outlet and any ashes deposited in the vicinity of the burner end.

The ash screen 44 is formed of metal, such as stainless steel, and is arranged over and attached to the outlet 22. As shown in FIG. 2, the screen can be formed in a domed configuration, among others. Additionally, a collar 48 also can be incorporated which extends around the venturi and overlies the edges of the screen 44.

In a preferred embodiment (FIG. 5), the ash retainer 46 is configured as a semicylindrical metal housing which is adapted to mount to the interior of the grill casing 38, such as by bolting the retainer through orifice 50, welding, etc. Various other sizes and shapes of retainers are envisioned, although not shown, which include cubic structures, among others, with the principle function of the retainer being to a least partially shelter the burner outlet from ash accumulation. Once so mounted, the retainer 46 at least partially encases the burner end 24 while extending beyond the burner outlet 26 so that a sufficient air gap is formed between the interior of the retainer and the burner outlet to allow for flame propagation even if the retainer is substantially buried by ashes.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

Therefore, we claim:

1. A gas burner for a smoker grill, the smoker grill having a smoker casing and a gas supply, said gas burner comprising:

a venturi tube having an inlet adapted and arranged for receiving a flow of gas from a gas supply, a burner end adapted and arranged for placement within the interior of a smoker casing, said burner end having a burner outlet, and at least one air inlet arranged through said venturi tube and located adjacent said inlet; and an ash guard at least partially encasing said burner outlet, said ash guard having an ash screen disposed about said burner outlet and an ash retainer adapted and arranged for mounting to the interior of a smoker casing.

2. The gas burner of claim 1, wherein said ash retainer is configured as a housing for at least partially surrounding said burner outlet such that an air gap is formed between said ash screen and said ash retainer.

3. The gas burner of claim 2, wherein said ash retainer is an elongated semi-cylindrical metal housing.

4. A gas burner for a smoker grill, the smoker grill having a casing and a gas supply, said gas burner comprising:

a gas regulator for receiving a flow of gas from a gas supply such that said regulator is capable of regulating the flow of gas;

a venturi tube having an inlet adapted and arranged for receiving a regulated flow of gas from said regulator, a burner end adapted and arranged for placement within the interior of a smoker casing, said burner end having a burner outlet, at least one air inlet arranged through said venturi tube and located adjacent said inlet, said air inlet having a spider guard attached thereto, and a support bracket extending outwardly from said venturi tube and arranged between said air inlet and said burner outlet; and an ash guard at least partially encasing said burner outlet, said ash guard having an ash screen disposed about said burner outlet.

5. The gas burner of claim 4, wherein said support bracket is adapted and arranged for mounting to the exterior of a smoker casing and wherein said support bracket has at least one mounting orifice extending therethrough such that said mounting orifice is adapted to receive a bolt for securing said support bracket to a smoker casing.

6. The gas burner of claim 4, wherein said ash guard further comprises an ash retainer adapted and arranged for mounting to the interior of a smoker casing and configured as a housing for at least partially surrounding said burner outlet such that an air gap is formed between said burner outlet and said ash retainer.

7. The gas burner of claim 6, wherein said ash retainer is an elongated semi-cylindrical metal housing.

8. A smoker grill, comprising:

a gas supply tank;

a gas regulator for receiving a flow of gas from said gas supply tank such that said regulator is capable of regulating said flow of gas;

a smoker casing having an interior and an exterior;

a venturi tube having an inlet adapted and arranged for receiving a regulated flow of gas from said regulator, a burner end adapted and arranged for placement within the interior of said smoker casing, said burner end having a burner outlet, at least one air inlet arranged through said venturi tube and located adjacent said inlet, and a support bracket extending outwardly from said venturi tube and arranged between said air inlet and said burner outlet; and an ash guard encasing said burner outlet.

9. The gas smoker grill of claim 8, wherein said support bracket is adapted and arranged for mounting to said smoker casing.

10. The gas smoker grill of claim 8, wherein said ash guard comprises an ash retainer, said ash retainer adapted and arranged for mounting to the interior of said smoker casing and configured as a housing for at least partially surrounding said burner outlet such that an air gap is formed between said burner outlet and said ash retainer.

11. The gas smoker grill of claim 8, wherein said ash guard further comprises an ash screen disposed about and encasing said burner outlet.

12. A gas burner for a smoker grill, the smoker grill having a casing and a gas supply, said gas burner comprising:

a venturi tube having an inlet adapted and arranged for receiving a flow of gas from a gas supply, a burner end adapted and arranged for placement within the interior of a smoker casing, said burner end having a burner outlet, and at least one air inlet arranged through said venturi tube and located adjacent said inlet, said venturi tube having a support bracket extending outwardly therefrom arranged between said air inlet and said burner outlet, said support bracket being adapted and arranged for mounting to the exterior of a smoker casing; and an ash guard at least partially encasing said burner end, said ash guard having an ash screen disposed about said burner outlet and an ash retainer adapted and arranged for mounting to the interior of a smoker casing.

13. The gas burner of claim 12, wherein said ash retainer is configured as a housing for at least partially surrounding said burner outlet such that an air gap is formed between said ash screen and said ash retainer.

14. The gas burner of claim 13, wherein said ash retainer is an elongated semi-cylindrical metal housing.

15. A gas burner for a smoker grill, the smoker grill having a casing and a gas supply, said gas burner comprising:

a gas regulator for receiving a flow of gas from a gas supply such that said regulator is capable of regulating the flow of gas;

a venturi tube having an inlet adapted and arranged for receiving a regulated flow of gas from said regulator, a burner end adapted and arranged for placement within the interior of a smoker casing, said burner end having a burner outlet, at least one air inlet arranged through said venturi tube and located adjacent said inlet, and a support bracket extending outwardly from said venturi tube and arranged between said air inlet and said burner outlet and being adapted and arranged for mounting to the exterior of a smoker casing, said support bracket having at least one mounting orifice extending therethrough such that said mounting orifice is adapted to receive a bolt for securing said support bracket to the smoker casing; and an ash guard at least partially encasing said burner end, said ash guard having an ash retainer adapted and arranged for mounting to the interior of a smoker casing and configured as a housing for at least partially surrounding said burner outlet such that an air gap is formed between said ash screen and said ash retainer.

16. The gas burner of claim 15, wherein said ash retainer is an elongated semi-cylindrical metal housing.

17. A smoker grill, comprising:

a gas supply tank;

a gas regulator for receiving a flow of gas from said gas supply tank such that said regulator is capable of regulating said flow of gas;

a smoker casing having an interior and an exterior;

a venturi tube having an inlet adapted and arranged for receiving a regulated flow of gas from said regulator, a burner end adapted and arranged for placement within the interior of said smoker casing, said burner end having a burner outlet, at least one air inlet arranged through said venturi tube and located adjacent said inlet, and a support bracket extending outwardly from said venturi tube and arranged between said air inlet and said burner outlet, said support bracket being adapted and arranged for mounting to the exterior of said smoker casing, said air inlet having a spider guard attached thereto; and an ash guard at least partially encasing said burner end.

18. The gas smoker grill of claim 17, wherein said ash guard comprises an ash retainer, said ash retainer adapted and arranged for mounting to the interior of said smoker casing and configured as a housing for at least partially surrounding said burner outlet such that an air gap is formed between said burner outlet and said ash retainer.

* * * * *